(12) United States Patent
AlKawai

(10) Patent No.: US 12,298,457 B2
(45) Date of Patent: May 13, 2025

(54) METHOD OF STRATIGRAPHIC CALIBRATION

(71) Applicant: SAUDI ARABIAN OIL COMPANY, Dhahran (SA)

(72) Inventor: Wisam AlKawai, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 22 days.

(21) Appl. No.: 17/823,890

(22) Filed: Aug. 31, 2022

(65) Prior Publication Data

US 2024/0069227 A1    Feb. 29, 2024

(51) Int. Cl.
*G01V 1/28* (2006.01)
*G01V 1/00* (2024.01)

(52) U.S. Cl.
CPC .............. *G01V 1/282* (2013.01); *G01V 1/003* (2013.01); *G01V 2210/1295* (2013.01); *G01V 2210/1425* (2013.01); *G01V 2210/665* (2013.01)

(58) Field of Classification Search
CPC ................... G01V 1/282; G01V 1/003; G01V 2210/1295; G01V 2210/1425; G01V 2210/665
See application file for complete search history.

(56) References Cited

U.S. PATENT DOCUMENTS

| | | |
|---|---|---|
| 10,087,723 B2 | 10/2018 | Harris et al. |
| 10,365,403 B2 | 7/2019 | Aldea et al. |
| 10,983,232 B2 | 4/2021 | Ba et al. |
| 2005/0065729 A1* | 3/2005 | Masson ................. G01V 1/282 702/2 |
| 2018/0372901 A1* | 12/2018 | Wang ....................... G01V 1/42 |
| 2019/0219734 A1* | 7/2019 | Solans ................ G01V 99/005 |

(Continued)

OTHER PUBLICATIONS

Durrani et al. "Characterization of carbonate reservoir using post-stack global geostatistical acoustic inversion approach: A case study from a mature gas field, onshore Pakistan." Journal of Applied Geophysics 188 (2021) (Year: 2021).*

(Continued)

*Primary Examiner* — Yuqing Xiao
*Assistant Examiner* — Christopher Richard Walker
(74) *Attorney, Agent, or Firm* — Osha Bergman Watanabe & Burton LLP

(57) ABSTRACT

Systems and methods are disclosed. The method includes obtaining a seismic dataset for a subterranean region of interest and determining an inverted value of a stratum parameter by applying seismic inversion to the seismic dataset. The method further includes obtaining a well dataset within the subterranean region of interest and determining a standard deviation of the stratum parameter using the well dataset. The method still further includes iteratively or recursively defining a geological boundary condition for the subterranean region of interest, determining a stratigraphic model by applying forward stratigraphic modeling using the geological boundary condition, determining a measured value of the stratum parameter by applying a rock physics model to the stratigraphic model, and calculating the misfit value using the inverted value, the standard deviation, and the measured value until a misfit value is below a tolerance value. The stratigraphic model is then selected as a calibrated stratigraphic model.

17 Claims, 7 Drawing Sheets

(56) References Cited

U.S. PATENT DOCUMENTS

| | | | |
|---|---|---|---|
| 2019/0265373 A1* | 8/2019 | Ito | E21B 17/025 |
| 2019/0369278 A1* | 12/2019 | Zhang | G06F 17/12 |
| 2020/0116883 A1* | 4/2020 | Padhi | G01V 1/305 |
| 2020/0292722 A1* | 9/2020 | Maucec | G01V 1/306 |
| 2020/0380390 A1 | 12/2020 | Sun et al. | |
| 2021/0199844 A1 | 7/2021 | Malinouskaya et al. | |
| 2021/0255345 A1* | 8/2021 | Liu | G01V 1/301 |

OTHER PUBLICATIONS

Al Kawai, Wisam et al., "Intergrating basin modeling with seismic technology and rock physics"; Geophysical Prospecting; vol. 64, Issue 6; pp. 1556-1574; Oct. 2016 (19 pages).

Alkawai, Wisam H. et al., "Integrating statistical rock physics and pressure and thermal history modeling to map reservoir lithofacies in the deepwater Gulf of Mexico"; Geophysics; vol. 83, Issue 4; pp. IM15-IM28; Jul.-Aug. 2018 (14 pages).

Petmecky, R. Stephan et al., "Improving sub-salt imaging using 3D basin model derived velocities"; Marine and Petroleum Geology; vol. 26, Issue 4; pp. 457-463; Apr. 2009 (7 pages).

\* cited by examiner

METHOD OF STRATIGRAPHIC CALIBRATION

BACKGROUND

Forward stratigraphic modeling simulates dynamic geological processes, such as deposition, erosion, and compaction, to predict the development of strata distribution and composition for a subterranean region of interest. Such a simulation may provide insight into if the subterranean region of interest contains a hydrocarbon reservoir. Forward stratigraphic modeling may be performed using physics-based equations that govern strata motion and interaction over time. The physics-based equations may be constrained by geological boundary conditions. Geological boundary conditions may include subsidence rates and sediment supply. However, geological boundary conditions, especially those associated with the past, may present great uncertainty.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method. The method includes obtaining a seismic dataset for a subterranean region of interest and determining an inverted value of a stratum parameter by applying seismic inversion to the seismic dataset. The method further includes obtaining a well dataset within the subterranean region of interest and determining a standard deviation of the stratum parameter using the well dataset. The method still further includes iteratively or recursively defining a geological boundary condition for the subterranean region of interest, determining a stratigraphic model by applying forward stratigraphic modeling using the geological boundary condition, determining a measured value of the stratum parameter by applying a rock physics model to the stratigraphic model, and calculating the misfit value using the inverted value, the standard deviation, and the measured value until a misfit value is below a tolerance value. The stratigraphic model is then selected as a calibrated stratigraphic model.

In general, in one aspect, embodiments relate to a non-transitory computer-readable memory having computer-executable instructions stored thereon that are executable by a computer processor. The computer-executable instructions cause the computer processor to perform steps that include receiving a seismic dataset for a subterranean region of interest and determining an inverted value of a stratum parameter by applying seismic inversion to the seismic dataset. The steps further include receiving a well dataset within the subterranean region of interest and determining a standard deviation of the stratum parameter using the well dataset. The steps still further include iteratively or recursively defining a geological boundary condition for the subterranean region of interest, determining a stratigraphic model by applying forward stratigraphic modeling using the geological boundary condition, determining a measured value of the stratum parameter by applying a rock physics model to the stratigraphic model, and calculating the misfit value using the inverted value, the standard deviation, and the measured value until a misfit value is below a tolerance value. The stratigraphic model is then selected as a calibrated stratigraphic model.

In general, in one aspect, embodiments relate to a system. The system includes a seismic acquisition system to obtain a seismic dataset for a subterranean region of interest, a well logging system to obtain a well dataset within the subterranean region of interest, and a computer comprising a computer processor. The computer processor is configured to receive the seismic dataset and determine an inverted value of a stratum parameter by applying seismic inversion to the seismic dataset. The computer processor further executes instructions to receive the well dataset and determine a standard deviation of the stratum parameter using the well dataset. The computer processor still further executes instructions to iteratively or recursively define a geological boundary condition for the subterranean region of interest, determine a stratigraphic model by applying forward stratigraphic modeling using the geological boundary condition, determine a measured value of the stratum parameter by applying a rock physics model to the stratigraphic model, and calculate the misfit value using the inverted value, the standard deviation, and the measured value until a misfit value is below a tolerance value. The stratigraphic model is then selected as a calibrated stratigraphic model.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
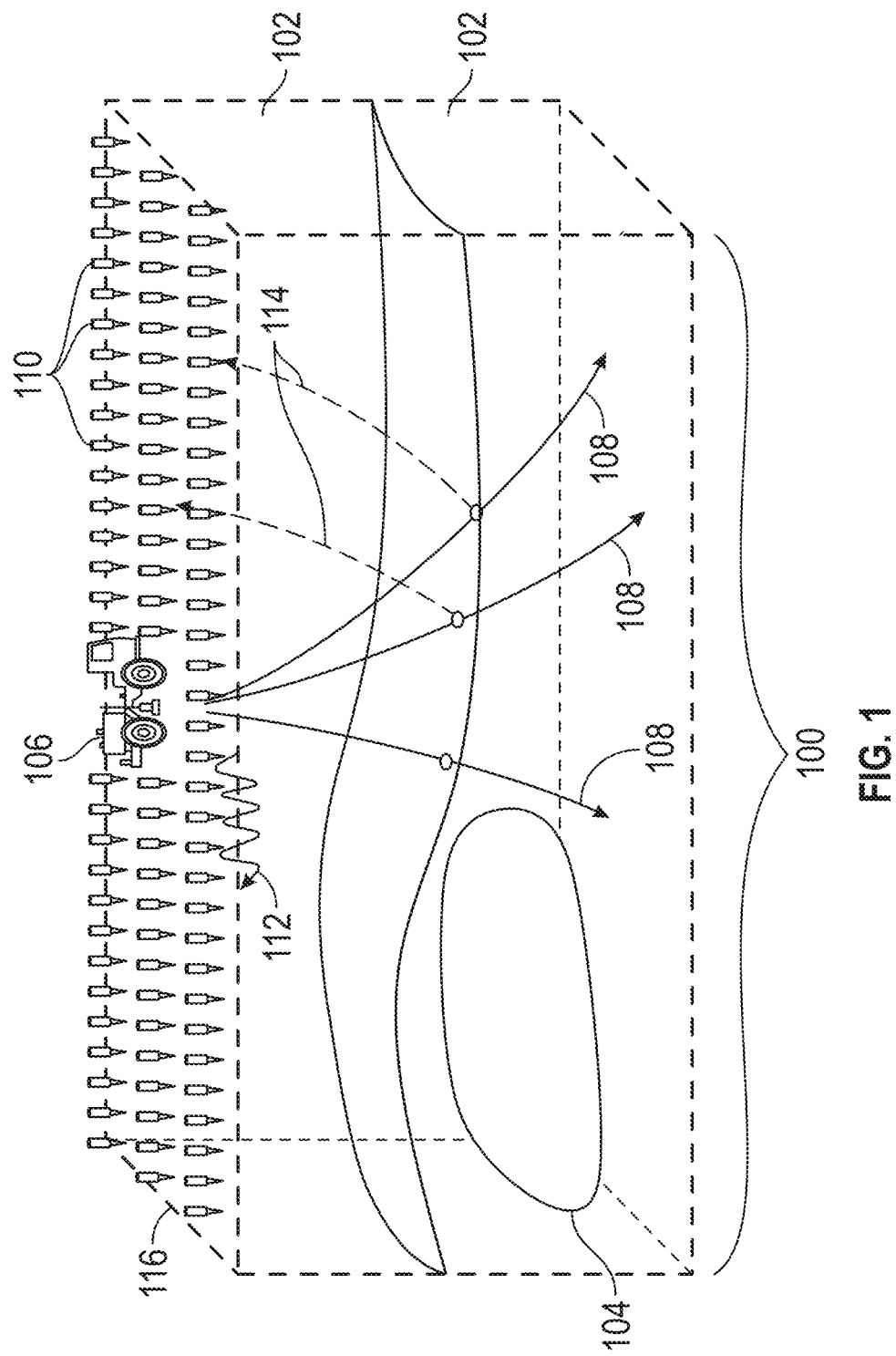
FIG. 1 illustrates a surface seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a stratigraphic model" includes reference to one or more of such models.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-7, any component described regarding a figure, in various embodiments disclosed herein, may be equivalent to one or more like-named components described regarding any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described regarding a corresponding like-named component in any other figure.

Strata, the plural of stratum, is defined as layers of sedimentary rock or simply sediment. Over geological time, strata distribution and composition within a subterranean region of interest change. Strata changes may be due to dynamic geological processes, such as, but are not limited to, sedimentation, erosion, compaction, and subsidence. Sedimentation is the process of creating, transporting, and depositing sediment. Erosion is the process of breaking down and removing sediment. Compaction is the process of consolidating sediment. Lastly, subsidence is the process of the sinking or rising of the surface of the Earth.

It may be challenging to quantify what and how geological processes alter strata distribution and composition due to the complex interplay between geological processes.

Forward stratigraphic modeling numerically simulates the complex interplay between geological processes to predict change in strata distribution and composition within a subterranean region of interest. Forward stratigraphic modeling may further simulate strata distribution and composition at discrete geological time steps (hereinafter a "geological time of interest"). Though, simulating strata distribution and composition for the present time may be the most common geological time of interest.

Forward stratigraphic modeling uses physics-based equations constrained by geological boundary conditions to simulate how geological processes affect strata distribution and composition. The physics-based equations may model strata as fluids and particles. Fluids within strata may include water, brine, and/or hydrocarbons. Particles within strata may include sandstone, carbonates, and shale. Specifically, the physics-based equations may include the Navier-Stokes equations, the hydrodynamic equations, and/or the diffusion equation. The Navier-Stokes equations describe viscous fluid motion. The hydrodynamic equations describe fluid movement. Lastly, the diffusion equation describes the macroscopic behavior of micro-particles due to random motion and particle collision. The geological boundary conditions constrain the physics-based equations based on sea levels, accommodation, sediment supply, subsidence rates, and variations of production of sediment classes with water depth or seabed slope.

Forward stratigraphic modeling results in a stratigraphic model. In some embodiments, a stratigraphic model may represent strata distribution and composition within the subterranean region of interest at the present time. A stratigraphic model may include spatially-varying parameters such as facies, porosity, and permeability.

However, geological boundary conditions may present great uncertainty. For example, the further into the past for which a geological boundary condition is associated with, the greater the uncertainty. Uncertainty in geological boundary conditions may propagate to stratigraphic model uncertainty. Forward stratigraphic modeling calibration may mitigate uncertainty. In the context of this disclosure, forward stratigraphic modeling calibration may be defined as the process of adjusting geological boundary conditions to produce a stratigraphic model within an acceptable range following forward stratigraphic modeling.

Systems and methods are disclosed for forward stratigraphic modeling calibration. Forward stratigraphic modeling calibration is performed using values of a stratum parameter. A first value of the stratum parameter is determined by applying seismic inversion to a seismic dataset. A second value of the stratum parameter is determined from a well dataset. A third value of the stratum parameter is determined from forward stratigraphic modeling. The three values of the stratum parameter are used to calculate a misfit value. The third value of the stratum parameter is iteratively updated until the misfit value is below a tolerance value.

Turning to FIG. 1, FIG. 1 depicts a subterranean region of interest (100) for the present time in accordance with one or more embodiments. The subterranean region of interest (100) includes strata (102) or layers of sedimentary rock. One stratum (102) may be a hydrocarbon reservoir (104). The subterranean region of interest (100) may be separated into regions or portions. Each portion may represent a homogeneity, such as a structural homogeneity or a seismic impedance homogeneity.

A seismic survey may be performed for the subterranean region of interest (100) using a seismic acquisition system. The seismic survey may use a seismic source (106) to generate radiated seismic waves (108). In a land environment, the seismic source (106) may be a dynamite source or one or more seismic vibrators ("vibroseis truck"). In a marine or lacustrine environment, the seismic source (106) may be an air gun. The radiated seismic waves (108) from a single activation of the seismic source (106) may be recorded by tens of thousands to hundreds of thousands of seismic receivers (110). In a land environment, the seismic receivers (110) may record the velocity or acceleration of ground motion. In a marine or lacustrine environment, the seismic receivers (110) may record pressure fluctuations.

Some radiated seismic waves (108) may propagate along the ground surface as surface waves or direct waves (alternatively "ground-roll") (112). Other radiated seismic waves (108) may propagate into the subterranean region of interest (100), reflect (and possibly refract) one or more times between strata (102), and return to the surface of the earth (116) as reflected seismic waves (114). Still other radiated seismic waves (108) may propagate into the subterranean region of interest (100), refract (and possibly reflect) one or more times between strata (102), and continue propagating into the subterranean region of interest (100) as refracted seismic waves (not shown).

Radiated seismic waves (108) generated by a single activation of the seismic source (106) are recorded by each seismic receiver (110) as a time series representing the amplitude of ground motion at a sequence of discrete times. The time series may be denoted a "seismic trace." The seismic source (106) is positioned at a location denoted ($x_s$, $y_s$) where x and y represent orthogonal axes on the surface of the earth (116) above the subterranean region of interest (100). The seismic receivers (110) are positioned at seismic receiver locations denoted (x r, y r). Thus, the radiated seismic waves (108) generated by a single activation of the seismic source (106) may be represented as a five-dimensional seismic dataset by ($x_s$, $y_s$, $x_r$, $y_r$, t) where t delimits the time sample at which the amplitude of ground motion was measured by each seismic receiver (110).

The seismic dataset described in FIG. 1 is one type of seismic dataset. Other types of seismic datasets include a gravity dataset, an active source resistivity dataset, a magneto-telluric dataset, or any combination of these datasets.

A seismic dataset may require processing, which may include seismic inversion, to extract meaningful information.

Figure 2:
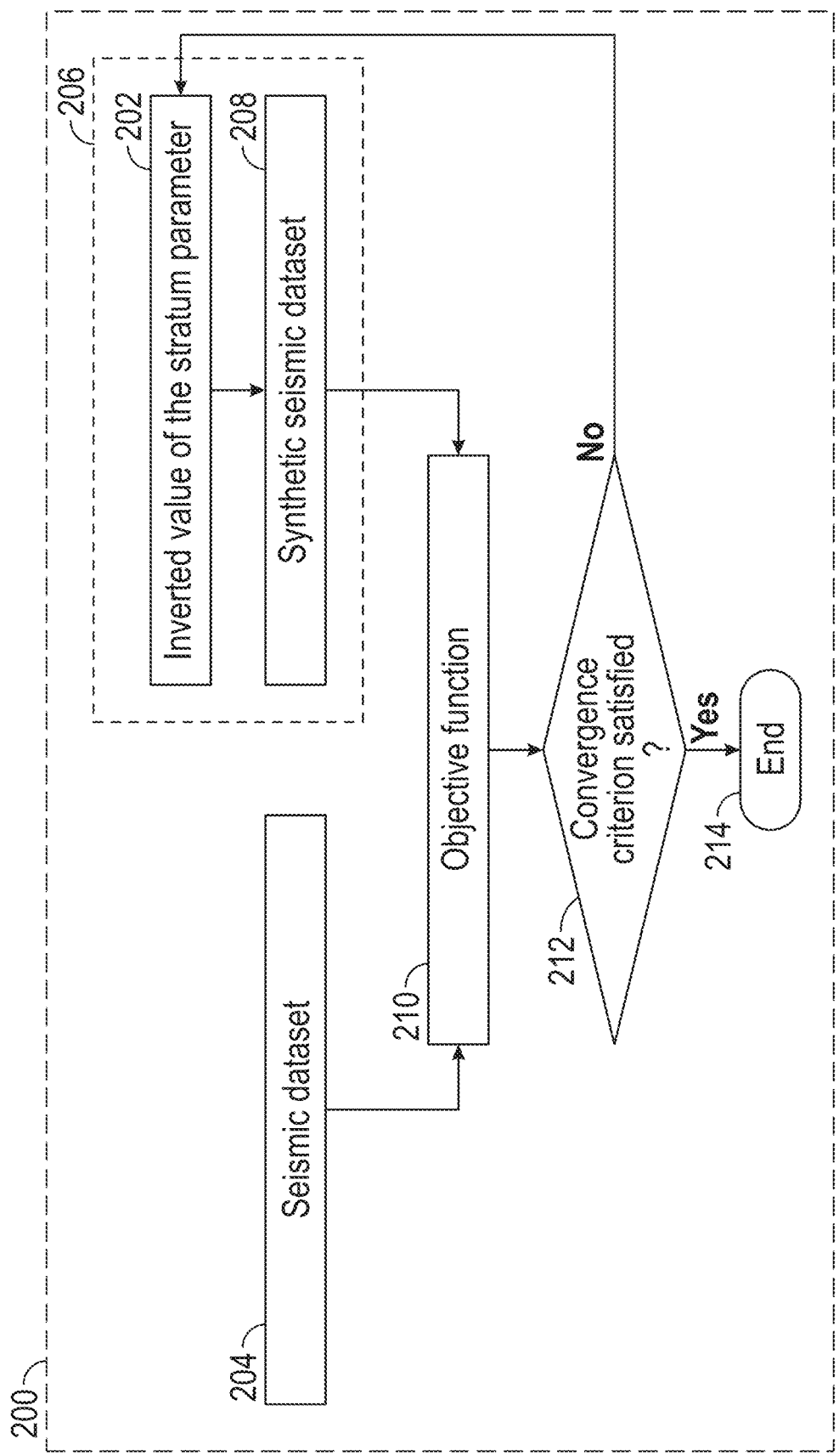
FIG. 2 illustrates seismic inversion in accordance with one or more embodiments.

FIG. 2 illustrates seismic inversion (200) in accordance with one or more embodiments. Seismic inversion (200) may be an iterative process that determines an inverted value of a stratum parameter (202) using the seismic dataset (204). In some embodiments, the stratum parameter may be seismic impedance or seismic velocity. Seismic inversion (200) may begin by initializing an inverted value of the stratum parameter (202). The initial inverted value of the stratum parameter (202) may be based, at least in part, on seismic surveys and well logs as well as rock core samples collected from the subterranean region of interest (100). Alternatively, the initial inverted value of the stratum parameter (202) may be assumed.

Forward modeling (206) may be applied to the inverted value of the stratum parameter (202) to determine a synthetic seismic dataset (208). Forward modeling (206) may be the process of solving or approximating physics-based equations that govern the relationship between the stratum parameter and the synthetic seismic dataset (208). For example, forward modeling (206) may be the process of solving the elastic wave equation to simulate how radiated seismic waves (108) propagate through the subterranean region of interest (100) using, in part, the inverted value of the stratum parameter (202). The synthetic seismic dataset (208) determined from forward modeling (206) may look similar to the seismic dataset (204) collected from the seismic survey described in FIG. 1.

In seismic inversion (200), an objective function (210) compares the synthetic seismic dataset (208) and the seismic dataset (204). A common objective function (210) includes a least-squares norm. An extremum of the objective function (210) may be found by iteratively perturbing the inverted value of the stratum parameter (202), re-determining the synthetic seismic dataset (208), re-determining the value of the objective function (210), and comparing the value of the objective function (210) to a convergence criterion (212). The extremum may be a minimum or a maximum of the objective function (210). Once the value of the objective function (210) satisfies the convergence criterion (212), the value of the objective function (210) is considered an extremum, the inverted value of the stratum parameter (202) is the value that adequately represents a discrete location within the subterranean region of interest (100), and the iterative process of seismic inversion (200) ends (214). If the value of the objective function (210) does not satisfy the convergence criterion (212), the inverted value of the stratum parameter (202) is perturbed. Perturbation may be defined as adjusting or deviating the inverted value of the stratum parameter (202) slightly relative to the inverted value of the stratum parameter (202) from the previous iteration. Perturbation for each iteration continues until the convergence criterion (212) is satisfied. The inverted value of the stratum parameter (202) may be perturbed such that the synthetic seismic dataset (208) more closely resembles the seismic dataset (204) relative to the synthetic seismic dataset (208) in the previous iteration.

Seismic inversion (200) of the seismic dataset (204) may provide spatially-expansive inverted values of the stratum parameter (202). However, the inverted values of the stratum parameter (202) may present uncertainty and/or limited resolution. A well dataset, while not spatially expansive, may be used to determine values of the stratum parameter with higher certainty and resolution.

FIG. 3A illustrates well datasets (300) in accordance with one or more embodiments. Each well dataset (300) may be collected using a well logging system deployed into a well (i.e., "downhole"). Note that the well traverses strata (102) within the subterranean region of interest (100). The well may or may not access a hydrocarbon reservoir (104). Returning to FIG. 3A, the sonic log (302) presented on track 1 may be determined from a sonic logging system. While downhole, the sonic logging system generates and records acoustic waves that propagate into the strata (102) neighboring the well. The density log (304) presented on track 2 may be determined from a density logging system. While downhole, the density logging system generates and records gamma rays that propagate into the strata (102) neighboring the well. The seismic impedance log (306) presented on track 3 may be the product of the sonic log (302) and density log (304). Further, a seismic velocity log may be determined from the sonic log (302). In some embodiments, the seismic impedance log (306) may be the values of the stratum parameter (308) at discrete depths (310). In other embodiments, other logs, such as the seismic velocity log, may be values of the stratum parameter (308) at discrete depths (310). In still other embodiments, values of the stratum parameter (308) at discrete depths (310) may be determined from rock core samples, another type of well dataset (300).

In some embodiments, the values of the stratum parameter (308) within one or more depth windows (311) of a log from a well may be used to determine a probability distribution (312) of the stratum parameter (308) at each discrete depth (310). In some embodiments, the one or more depth windows (311) may correspond to a homogeneous portion of a well log, like a single facies. In other embodiments, the values of the stratum parameter (308) within one or more depth windows (311) of multiple wells may be used to determine a probability distribution (312) of the stratum parameter (308) at each discrete depth (310). In the context of this disclosure, "probability distribution" is synonymous to "probability density" and "probability mass."

In some embodiments, the probability distribution (312) may be a Gaussian distribution as shown in FIG. 3B. A Gaussian distribution assumes that for each discrete depth (310), ~68% of the values of the stratum parameter (308) determined from the one or more well datasets (300) will be within one standard deviation (±1σ) of the mean μ, ~95.5% of the values of the stratum parameter (308) will be within two standard deviations (±2σ) of the mean μ, and ~99.7% of the values of the stratum parameter (308) will be within three standard deviations (±3σ) of the mean μ. If the probability distribution (312) is a Gaussian distribution, the standard deviation σ may be determined as:

$$\sigma = \sqrt{\frac{\sum (x_i - \mu)^2}{N}}, \quad \text{Equation (1)}$$

where $x_i$ is each value of the stratum parameter (308) within one or more depth windows (311) where i=1, . . . , N, μ is the mean of the values of the stratum parameter (308), and N is the number of values of the stratum parameter (308). Hereinafter, "standard deviation of the stratum parameter" will refer to the standard deviation of the values of the stratum parameter (308) determined from one or more well datasets (300).

Figure 3:
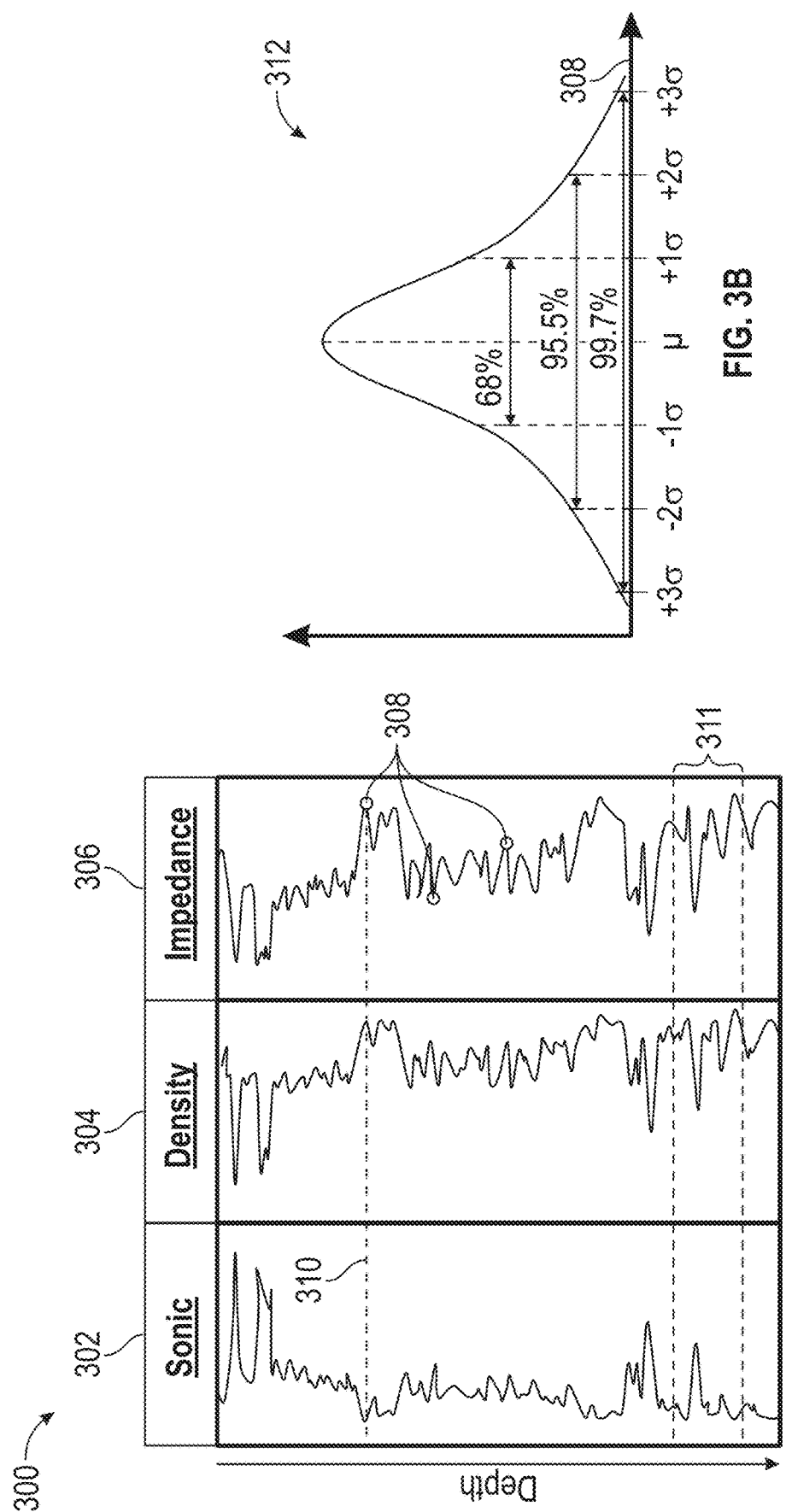
FIG. 3A illustrates well datasets in accordance with one or more embodiments.
FIG. 3B depicts a probability distribution in accordance with one or more embodiments.

The inverted value of the stratum parameter (202) described in FIG. 2 and the standard deviation of the stratum parameter described in FIG. 3 may be used for forward stratigraphic modeling calibration. However, prior to forward stratigraphic modeling calibration, a rock physics model may be used to transform a stratigraphic model into a measured value of the stratum parameter.

Figure 4:
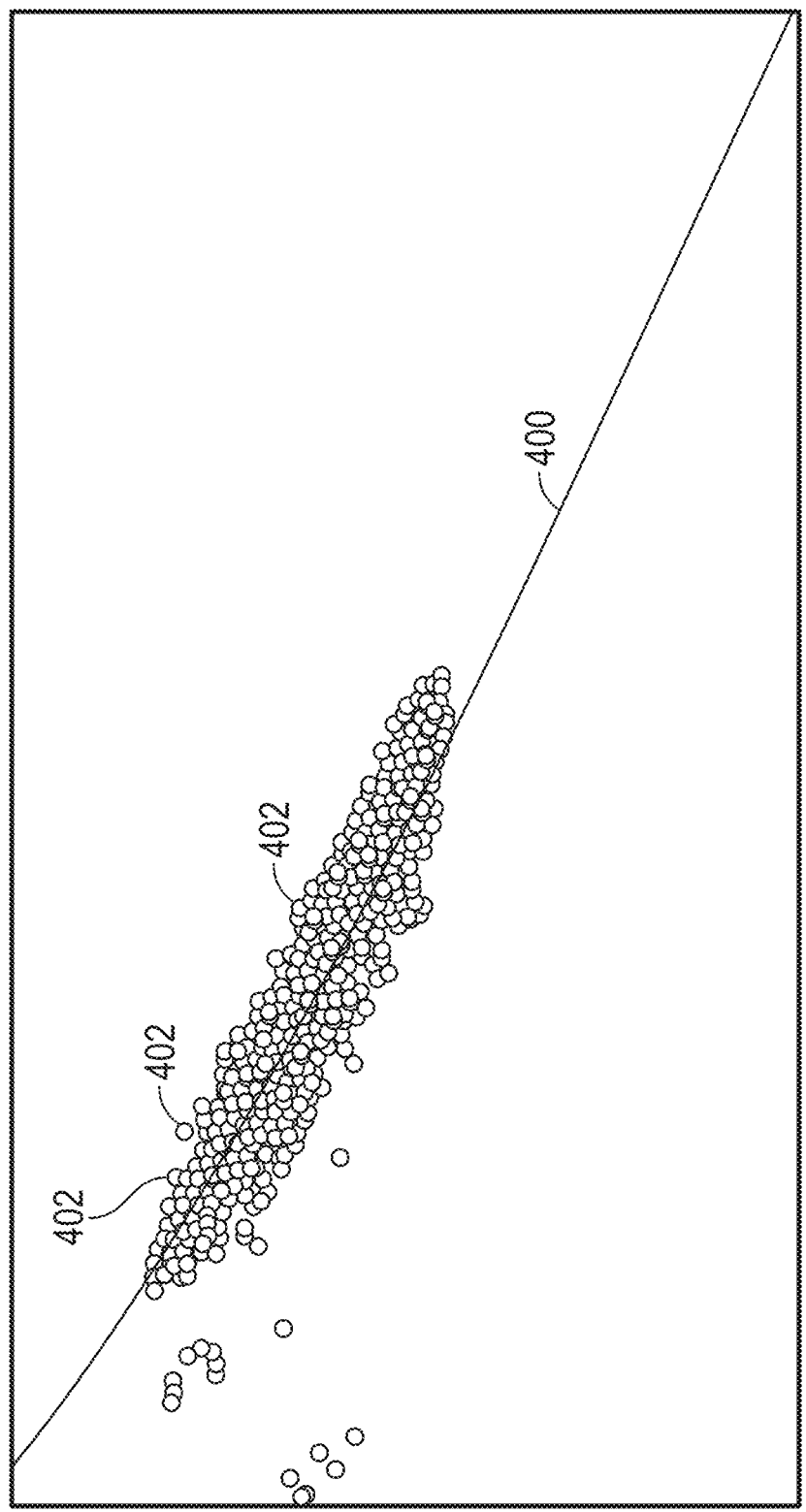
FIG. 4 presents a rock physics model in accordance with one or more embodiments.

FIG. 4 presents a rock physics model (400) that defines a stratum parameter-stratigraphic model parameter relationship. In some embodiments, the stratigraphic model parameter presented on the abscissa and the stratum parameter presented on the ordinate may be measured in a laboratory. For example, porosity, a type of stratigraphic model parameter, may be measured using rock core samples. The rock core samples may then be subjected to an acoustic (ultrasonic) source to measure seismic impedance, a type of stratum parameter. Stratum parameter-stratigraphic model parameter pairs (402) may be plotted. The rock physics model (400), such as a constitutive model, may then be fit to the pairs (402). A person of ordinary skill in the art will appreciate the vast number of rock physics models (400) that may be used depending on the stratum parameter-stratigraphic model parameter pairs (402).

Figure 5:
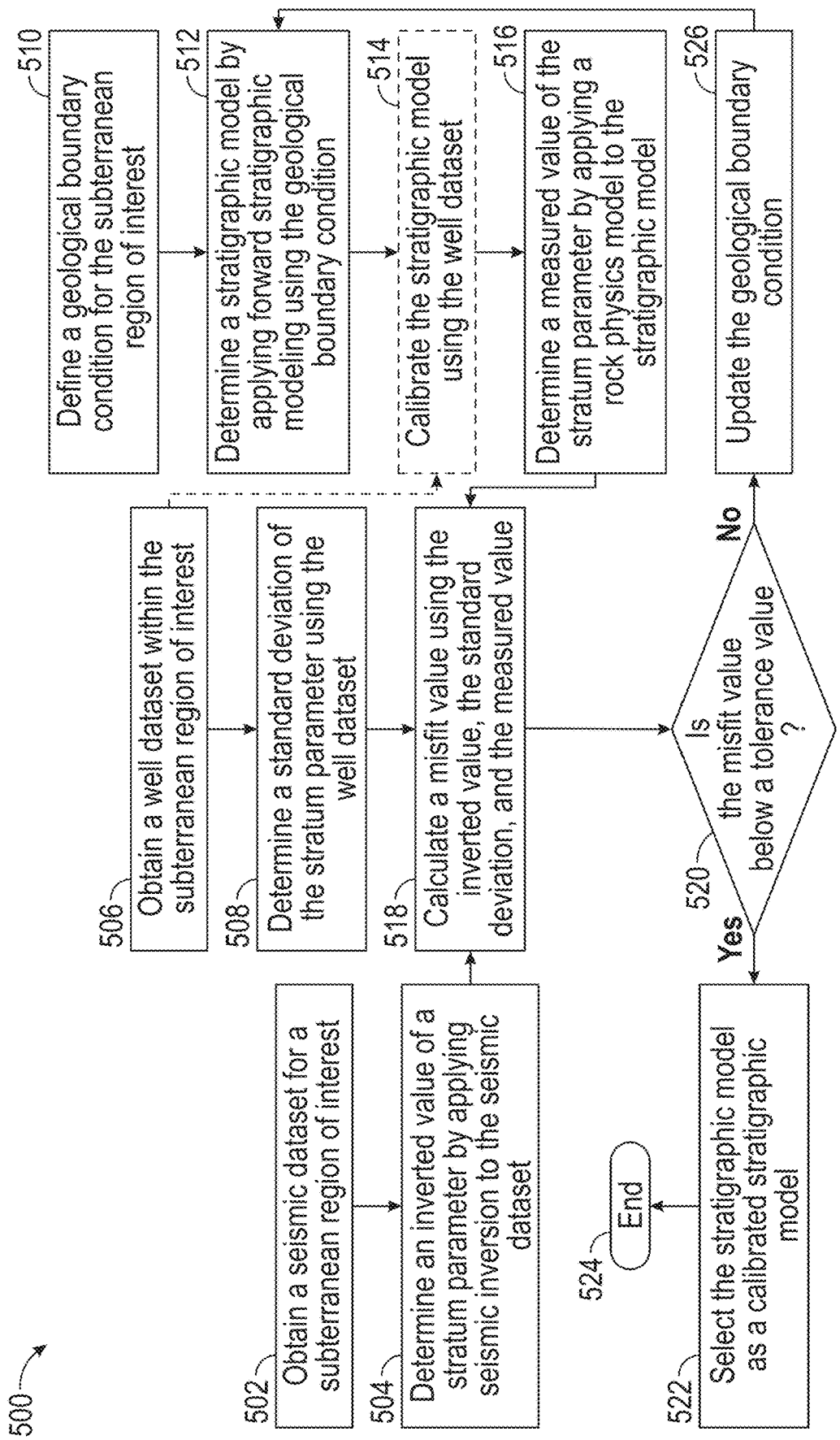
FIG. 5 shows a flowchart in accordance with one or more embodiments.

FIG. 5 shows a flowchart (500) describing a workflow for forward stratigraphic modeling calibration, in accordance with one or more embodiments.

In step 502, a seismic dataset (204) for a subterranean region of interest (100) is obtained. The seismic dataset (204) may be obtained from a seismic survey as described in FIG. 1. The seismic dataset (204) may characterize the subterranean region of interest (100) for the present time in the form of seismic traces.

In step 504, an inverted value of the stratum parameter (202) is determined by applying seismic inversion (200) to the seismic dataset (204) as shown in FIG. 2. Several types of seismic inversion may be applied without departing from the scope of the disclosure. For example, seismic inversion (200) may be traveltime inversion, amplitude versus offset inversion, or full waveform inversion depending on what attributes of the seismic traces are used for seismic inversion (200). Attributes may include reflection amplitude, variation of reflection amplitude with seismic source to seismic receiver separation, traveltime, frequency, and phase. An inverted value of the stratum parameter (202) may present for discrete locations within a subterranean region of interest (100). In some embodiments, discrete locations may be defined based on the resolution of the seismic dataset (204). For example, if the seismic dataset (204) is two-dimensional, a pixel may represent a discrete location. If the seismic dataset (204) is three-dimensional, a voxel may represent a discrete location.

In step 506, one or more well datasets (300) within the subterranean region of interest (100) are obtained as shown in FIG. 3A. In some embodiments, one or more well datasets (300) may be obtained for each portion within the subterranean region of interest (100). Each portion may be a region of structural homogeneity and/or seismic impedance homogeneity.

In step 508, a standard deviation of the stratum parameter is determined using the one or more well datasets (300). In some embodiments, a well dataset (300) may be values of the stratum parameter (308). In other embodiments, multiple well datasets (300) may be used to determine the values of the stratum parameter (308). A probability distribution (312) may be used to represent the values of the stratum parameter at each discrete depth (310). In some embodiments, the probability distribution (312) may be a Gaussian distribution as shown in FIG. 3B. A standard deviation σ may be determined assuming the probability distribution (312). For example, if the probability distribution (312) is a Gaussian distribution, the standard deviation σ may be determined using Equation (1). The standard deviation may present for discrete locations neighboring the wells. In some embodiments, pixels or voxels may represent the discrete locations.

In step 510, one or more geological boundary conditions are defined. Geological boundary conditions may be defined for each portion within the subterranean region of interest (100). Geological boundary conditions may be associated with dynamic geological processes affecting each portion within the subterranean region of interest (100). Specifically, geological boundary conditions may be associated with sea levels, sediment supply, accommodation, subsidence rates, and variations of production of sediment classes with water depth or seabed slope.

In step 512, a stratigraphic model is determined by applying forward stratigraphic modeling using the geological boundary conditions. The stratigraphic model may be characterized by one or more stratigraphic model parameters such as spatially-varying facies, porosity, and permeability within the subterranean region of interest (100) for a geological time of interest. In some embodiments, the stratigraphic model may present for the same discrete locations as the inverted values of the stratum parameter (202) determined from the seismic dataset (204) in step 504. The discrete locations may be represented by pixels or voxels.

Step 514 is optional. In step 514, the stratigraphic model may be calibrated to one or more well datasets (300). Step 514 may be an iterative process where geological boundary conditions are updated until the stratigraphic model agrees with well datasets (300) at discrete locations near the wells. However, step 514 may not robustly calibrate the stratigraphic model as well datasets (300) may only sparsely characterize the subterranean region of interest (100) near the wells.

In step 516, a measured value of the stratum parameter is determined by applying a rock physics model (400) to the stratigraphic model as described in FIG. 4. The measured value of the stratum parameter may present for discrete locations within the subterranean region of interest (100). In some embodiments, discrete locations may be defined based on the resolution of the seismic dataset (204). In other embodiments, discrete locations may be defined based on the resolution of the stratigraphic model.

In step 518, a misfit value is determined using the inverted value of the stratum parameter s 1 (202) from step 504, the standard deviation of the stratum parameter σ from step 508, and the measured value of the stratum parameter $s_m$ from step 516. For example, the misfit value, m, may be defined by:

$$m = \left| \frac{s_m - s_i}{\sigma} \right|. \qquad \text{Equation (2)}$$

The inverted value of the stratum parameter $s_i$ (202), the measured value of the stratum parameter $s_m$, and the standard deviation of the stratum parameter σ are all from the same homogeneous region, which may be the subterranean region of interest (100) or a portion of the subterranean region of interest (100). In some embodiments, the inverted value of the stratum parameter $s_i$ (202) and the measured value of the stratum parameter $s_m$, may be from the same discrete location—represented by pixels or voxels—within each portion. In other embodiments, the inverted value of the stratum parameter $s_i$ (202) and/or the measured value of the stratum parameter $s_m$ may be an average value of the stratum parameter of neighboring discrete locations. In other embodiments, different definitions of the misfit value, m, familiar to a person of ordinary skill in the art, may be used without departing from the scope of the invention.

In step 520, the misfit value, m, is compared to a tolerance value. The tolerance value may be defined based on how many standard deviations the difference between the measured value of the stratum parameter $s_m$ and the inverted value of the stratum parameter $s_i$ is acceptable. In some embodiments, it may be acceptable for the difference between the measured value of the stratum parameter $s_m$ and the inverted value of the stratum parameter $s_i$ to be within three standard deviations. In which case, the tolerance value may be set to three. If a smaller difference between the measured value of the stratum parameter $s_m$ and the inverted value of the stratum parameter $s_i$ is desired, the tolerance value may be set to two or lower.

If the misfit value, m, is below the tolerance value, the stratigraphic model determined in step 512 or 514 is selected as the calibrated stratigraphic model in step 522 and the workflow ends (524).

If the misfit value, m, is above the tolerance value, one or more geological boundary conditions may be updated in step 526. Steps 512, 514, 516, 518, and 520 may be repeated until the misfit value, m, is below the tolerance value.

Figure 6:
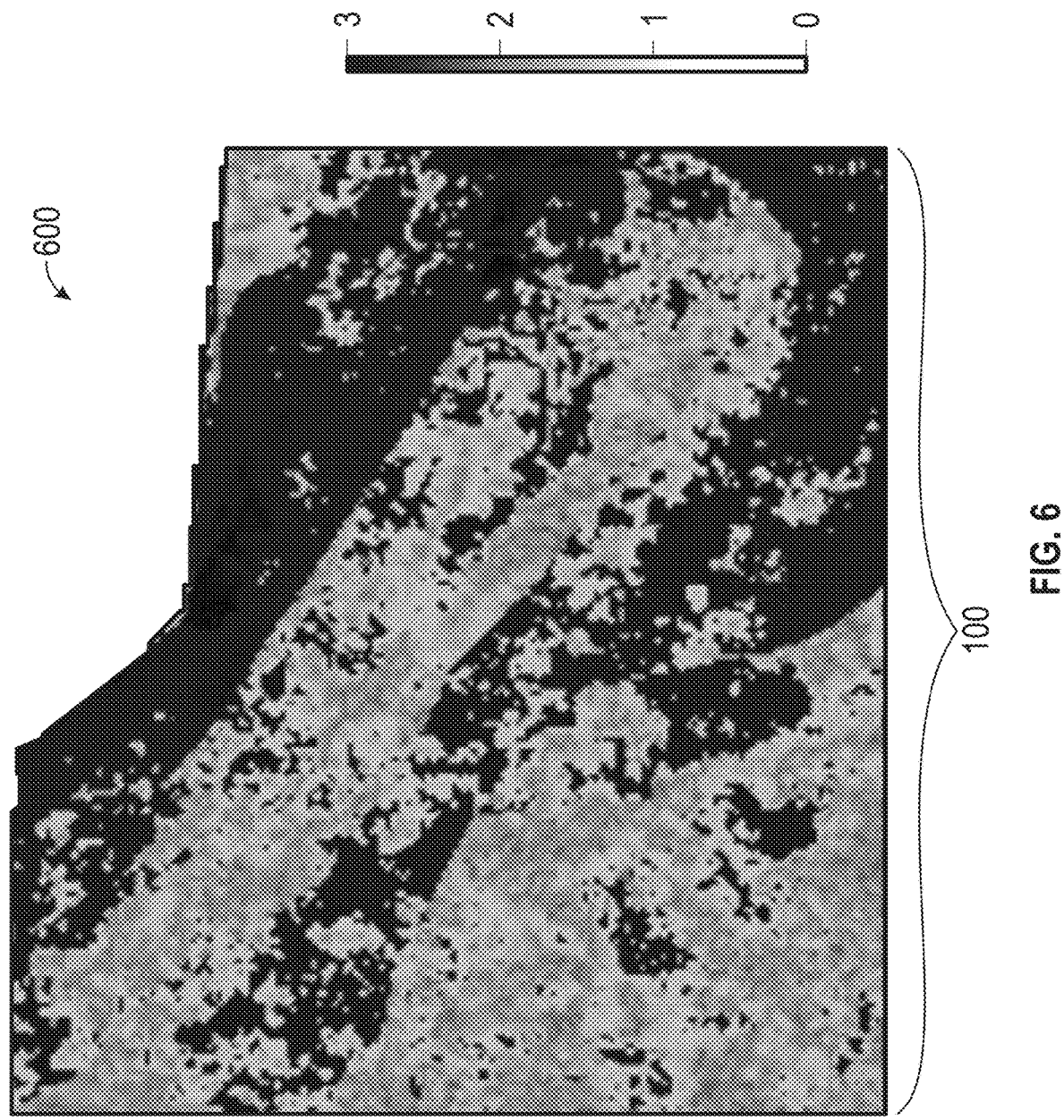
FIG. 6 illustrates misfit value map in accordance with one or more embodiments.

FIG. 6 depicts a misfit value map (600) for discrete locations across a subterranean region of interest (100) in accordance with one or more embodiments. In some embodiments, the subterranean region of interest (100) may present structural homogeneity, such as an anticline. The misfit values range between zero and less than three as shown by the scale bar. Assume the tolerance value is three. Then, the misfit value map (600) may present discrete locations where the misfit value is acceptable (i.e., where the misfit value is between zero and three). Thus, forward stratigraphic modeling calibration may be considered adequate.

Following the workflow for forward stratigraphic modeling calibration, certainty in both the geological boundary conditions and stratigraphic model may be gained. The calibrated stratigraphic model may then be used to determine the location of a hydrocarbon reservoir (104) within the subterranean region of interest (100).

Figure 7:
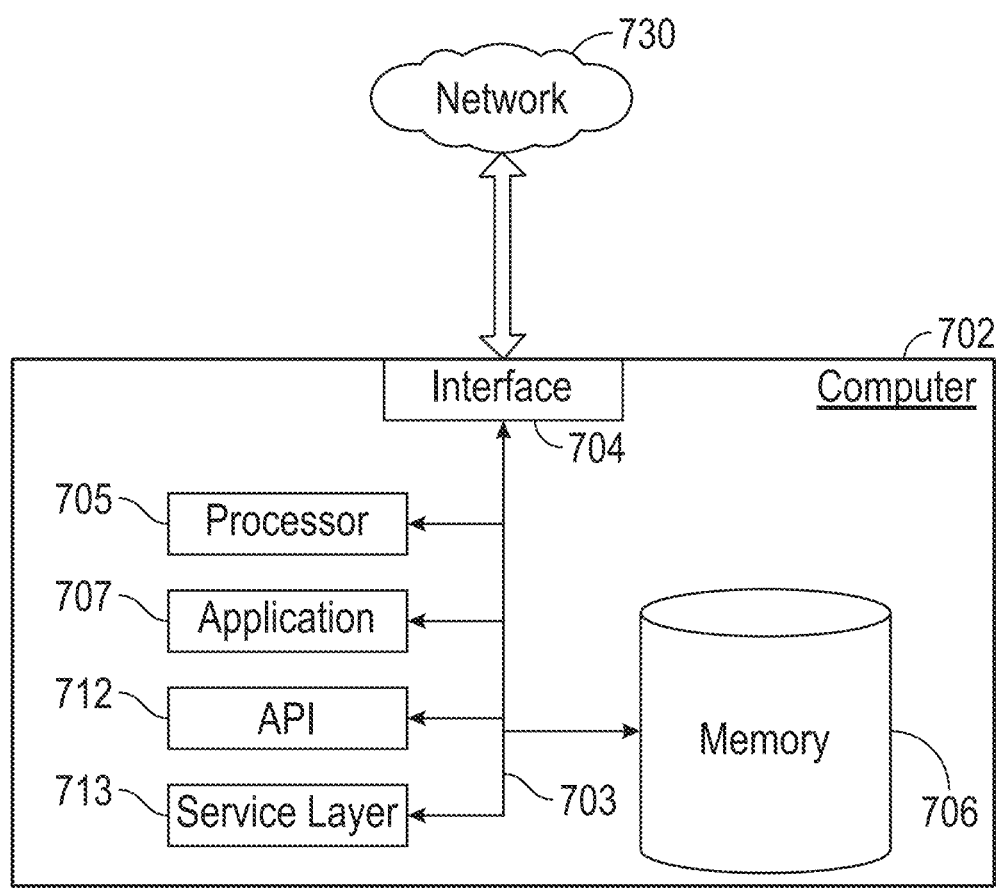
FIG. 7 denotes a computer in accordance with one or more embodiments.

FIG. 7 depicts a block diagram of a computer system (hereinafter also "computer") (702) used to provide computational functionalities associated with described algorithms, methods, functions, processes, flows, and procedures as described in this disclosure, according to one or more embodiments. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols, such as the Wellsite Information Transfer Specification (WITS) protocol, associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing a computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
    obtaining, by a computer processor, a seismic dataset for a subterranean region of interest, wherein the seismic dataset is obtained during a seismic survey using a seismic data acquisition system comprising at least one seismic source and a plurality of seismic receivers;
    determining, by the computer processor, first inverted seismic impedance data for the subterranean region of interest by applying seismic inversion to the seismic dataset;
    obtaining, by the computer processor, a well dataset within the subterranean region of interest, wherein the well dataset is based on a plurality of well logs and a plurality of rock core samples;
    determining, by the computer processor, a first stratigraphic model for the subterranean region of interest using forward stratigraphic modeling, the well dataset, and a rock physics model,
        wherein the forward stratigraphic modeling simulates a plurality of spatially-varying facies, porosity, and permeability of the subterranean region of interest based, at least in part on a geological boundary condition, and
        wherein the stratigraphic model comprises a probability distribution of seismic impedance at a plurality of depths of the subterranean region of interest and a plurality of standard deviations of seismic impedance;
    determining, by the computer processor, a first misfit value based on a difference between the probability distribution of seismic impedance in the first stratigraphic model, the first inverted seismic impedance data from the seismic dataset, and a plurality of standard deviations of a plurality of discrete locations in the probability distribution in the first stratigraphic model;
    determining, by the computer processor and iteratively, a calibrated stratigraphic model based on the first misfit value, wherein the first stratigraphic model and the first inverted seismic data are simulated until the first misfit value satisfies a convergence criterion; and
    determining a location of a hydrocarbon reservoir within the subterranean region of interest using the calibrated stratigraphic model.

2. The method of claim 1, wherein the seismic dataset comprises a time-migrated post-stacked seismic dataset.

3. The method of claim 1, wherein the first misfit value further comprises an absolute value of a quotient having a numerator comprising the difference between the probability distribution of seismic impedance in the first stratigraphic model and the first inverted seismic impedance data from the seismic dataset, and a denominator comprising the plurality of standard deviations of a plurality of discrete locations in the probability distribution in the first stratigraphic model.

4. The method of claim 1, wherein the subterranean region of interest comprises a homogeneous portion.

5. The method of claim 1, wherein the geological boundary condition comprises a subsidence rate.

6. The method of claim 1, wherein the stratigraphic model comprises a porosity.

7. The method of claim 1, wherein determining the stratigraphic model further comprises calibrating the stratigraphic model using the well dataset.

8. A non-transitory computer-readable memory having computer-executable instructions stored thereon that, when executed by a computer processor, cause the computer processor to perform steps comprising:
    receiving a seismic dataset for a subterranean region of interest, wherein the seismic dataset is obtained during a seismic survey using a seismic data acquisition system comprising at least one seismic source and a plurality of seismic receivers;
    determining first inverted seismic impedance data for the subterranean region of interest by applying seismic inversion to the seismic dataset;
    receiving a well dataset within the subterranean region of interest, wherein the well dataset is based on a plurality of well logs and a plurality of rock core samples;
    determining a first stratigraphic model for the subterranean region of interest using forward stratigraphic modeling, the well dataset, and a rock physics model,
        wherein the forward stratigraphic modeling simulates a plurality of spatially-varying facies, porosity, and permeability of the subterranean region of interest based, at least in part on a geological boundary condition, and
        wherein the stratigraphic model comprises a probability distribution of seismic impedance at a plurality of depths of the subterranean region of interest and a plurality of standard deviations of seismic impedance
    determining a first misfit value based on a difference between the probability distribution of seismic impedance in the first stratigraphic model, the first inverted seismic impedance data from the seismic dataset, and a plurality of standard deviations of a plurality of discrete locations in the probability distribution in the first stratigraphic model;
    determining, iteratively, a calibrated stratigraphic model based on the first misfit value, wherein the first stratigraphic model and the first inverted seismic data are simulated until the first misfit value satisfies a convergence criterion; and
    displaying a location of a hydrocarbon reservoir within the subterranean region of interest using the calibrated stratigraphic model.

9. The non-transitory computer-readable memory of claim 8, wherein the seismic dataset comprises a time-migrated post-stacked seismic dataset.

10. The non-transitory computer-readable memory of claim 8, wherein the first misfit value comprises an absolute value of a quotient having a numerator comprising the difference between the probability distribution of seismic impedance in the first stratigraphic model and the first inverted seismic impedance data from the seismic dataset, and a denominator comprising the plurality of standard deviations of a plurality of discrete locations in the probability distribution in the first stratigraphic model.

11. The non-transitory computer-readable memory of claim 8, wherein the subterranean region of interest comprises a homogeneous portion.

12. The non-transitory computer-readable memory of claim 8, wherein the geological boundary condition comprises a subsidence rate.

13. The non-transitory computer-readable memory of claim 8, wherein the stratigraphic model comprises a porosity.

14. The non-transitory computer-readable memory of claim 8, wherein determining the stratigraphic model further comprises calibrating the stratigraphic model using the well dataset.

15. A system, comprising:
    a seismic acquisition system to obtain a seismic dataset for a subterranean region of interest,
        wherein the seismic dataset is obtained during a seismic survey, and
        wherein the seismic acquisition system comprising at least one seismic source and a plurality of seismic receivers;
    a well logging system to obtain a well dataset within the subterranean region of interest; and
    a computer processor configured to:
        receive the seismic dataset,
        determine first inverted seismic impedance data for the subterranean region of interest by applying seismic inversion to the seismic dataset,
        receive the well dataset, wherein the well dataset is based on a plurality of well logs and a plurality of rock core samples
        determine a first stratigraphic model for the subterranean region of interest using forward stratigraphic modeling, the well dataset, and a rock physics model,
            wherein the forward stratigraphic modeling simulates a plurality of spatially-varying facies, porosity, and permeability of the subterranean region of interest based, at least in part on a geological boundary condition, and
            wherein the stratigraphic model comprises a probability distribution of seismic impedance at a plurality of depths of the subterranean region of interest and a plurality of standard deviations of seismic impedance,
        determine a first misfit value based on a difference between the probability distribution of seismic impedance in the first stratigraphic model, the first inverted seismic impedance data from the seismic dataset, and a plurality of standard deviations of a plurality of discrete locations in the probability distribution in the first stratigraphic model,
        determine, iteratively, a calibrated stratigraphic model based on the first misfit value, wherein the first stratigraphic model and the first inverted seismic data are simulated until the first misfit value satisfies a convergence criterion; and
        determine a location of a hydrocarbon reservoir within the subterranean region of interest using the calibrated stratigraphic model.

16. The system of claim 15, wherein the seismic acquisition system comprises a surface seismic acquisition system.

17. The system of claim 15, wherein the well logging system comprises a sonic logging system.

\* \* \* \* \*